June 21, 1932.  C. R. KUZELL  1,863,905
DISTRIBUTING AND FEEDING APPARATUS
Filed Oct. 22, 1929   2 Sheets-Sheet 1
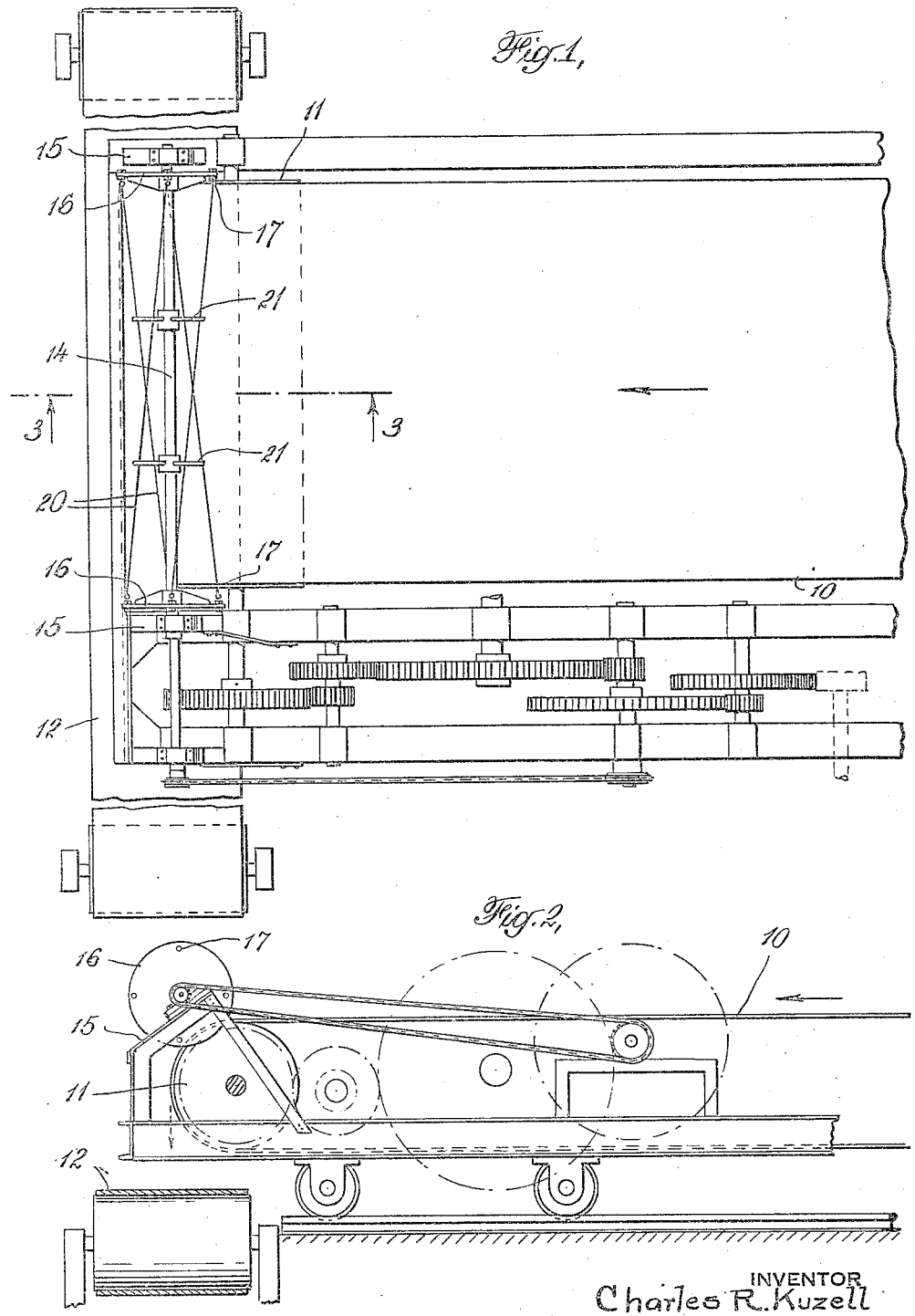

June 21, 1932.  C. R. KUZELL  1,863,905
DISTRIBUTING AND FEEDING APPARATUS
Filed Oct. 22, 1929  2 Sheets-Sheet 2

INVENTOR
Charles R. Kuzell
BY
Pennie, Davis, Marvin & Edmonds
HIS ATTORNEYS

Patented June 21, 1932

1,863,905

UNITED STATES PATENT OFFICE

CHARLES R. KUZELL, OF CLARKDALE, ARIZONA, ASSIGNOR TO UNITED VERDE COPPER COMPANY, OF CLARKDALE, ARIZONA, A CORPORATION OF DELAWARE

DISTRIBUTING AND FEEDING APPARATUS

Application filed October 22, 1929. Serial No. 401,482.

This invention relates to distributing and feeding apparatus and has for an object the provision of improved apparatus for distributing and feeding solid materials. More particularly, the invention contemplates the provision of improved apparatus for feeding and distributing solid materials which do not flow readily. The invention further contemplates the provision of improved apparatus for transferring solid materials from storage bins and the like to points at which they are to be used.

In various types of industrial operations, it is frequently necessary to use conveyors of the belt type for conveying materials from storage bins to points of use or treatment. Such methods are generally used in metalurigical operations for conveying ore, concentrates, fuel, fluxing agents and the like from storage bins to hoppers, chutes, and other feeding devices associated with the metallurigical furnaces.

Usually, at least one conveyor of the belt type is used for conveying the material from the storage bin or hopper to the point at which it is to be used. In cases in which a single conveyor is used, one end is disposed immediately under the discharge opening of the storage bin or hopper and the other end is disposed over the receptacle into which the material is to be discharged. If the material is not free flowing, a relatively large discharge opening is provided in the storage bin or hopper and a thick bed is formed on the conveyor. For this reason it is necessary to operate the conveyor at a relatively slow speed in order to avoid too rapid delivery of the material.

It is desirable or necessary at times to use two or more separate conveyors for handling the same materials successively. Thus, the storage bin or bins may be so located that their discharge chutes or hoppers are relatively inaccessible so that it is not possible to install a single conveyor directly connecting the storage bins with a point at which the stored materials are to be used. Also, it may be desirable to mix or prepare a charge on a conveyor in which event a series of conveyors each associated with one of a series or battery of storage bins may be provided together with a single conveyor so disposed that it may receive the materials from the series of conveyors associated with the storage bins. When two conveyors are used for conveying materials between two points their paths of travel are generally disposed at right angles to one another with the discharge end of the first conveyor disposed immediately above the second conveyor at some point betweeen its ends.

In order that the material may be discharged uniformly from the conveyor which receives it from the storage bin or hopper it is necessary that the material be free flowing. If the material has even a slight tendency to cake it will tend to build up on the conveyor and drop off the discharge end at irregular intervals in relatively large masses. This tendency is particularly noticeable in the handling of flotation concentrates, in the handling of other damp finely divided materials, and in cases where the conveyor is slow moving and designed to carry a thick bed of material.

The present invention contemplates the provision of means for uniformly discharging the burden from a loaded conveyor. The present invention further contemplates the provision of a conveying system in which a distributor or feeding device is disposed between two cooperating conveyors to uniformly deliver the load from one conveyor to the other.

Apparatus constructed in accordance with the present invention comprises a conveyor and a distributor capable of uniformly discharging the load from the conveyor mounted adjacent its discharge end. The apparatus of the invention may comprise two conveyors having their paths of travel angularly disposed with respect to one another, the discharge end of one being disposed above the carrying surface of the other and having a rotary distributor associated therewith. The rotary distributor may be of any desired construction, and it preferably rotates about an axis extending transversely of the path of travel of the conveyor with which it is associated. The distributor is provided with blades capable of cutting through the material being discharged. The blades may be parallel with the axis of the distributor or they may be angularly disposed with respect to the axis. In some cases, the use of a distributor in the form of a spiral screw is advisable. When the material to be discharged is somewhat sticky cutters may be provided between the ends of the distributor for further breaking up the caked material.

The invention will be better understood from a consideration of the following description in conjunction with the accompanying drawings in which is shown one of the preferred embodiments of the invention, and in which Fig. 1 is a plan of apparatus embodying the invention;

Fig. 2 is a side elevation of the apparatus shown in Fig. 1;

Figure 3:
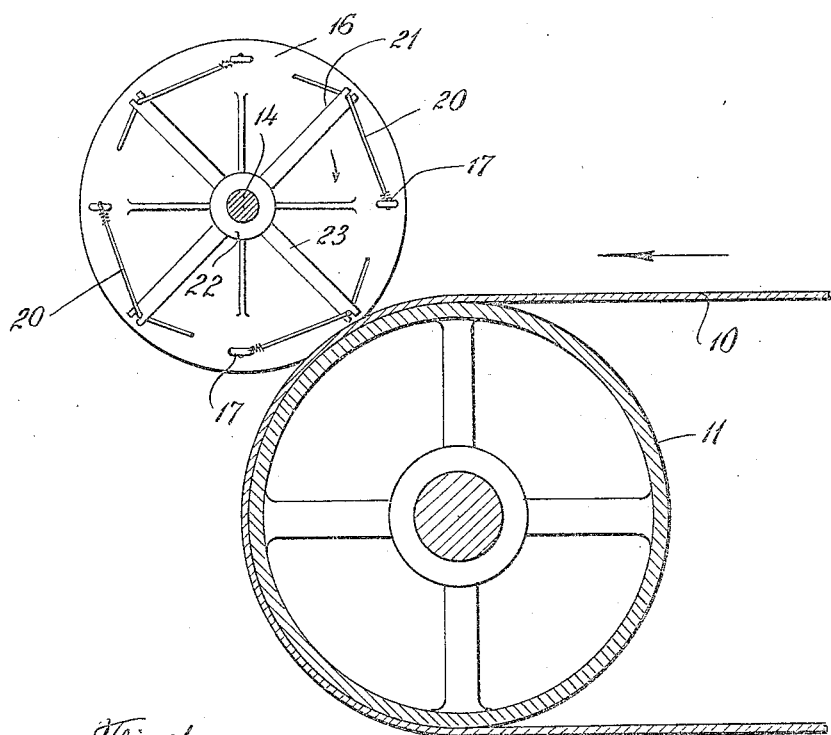
Fig. 3 is a sectional elevation taken substantially along line 3—3 of Fig. 1 and showing the construction and arrangement of the end and intermediate spiders of a distributor.
Figure 4:
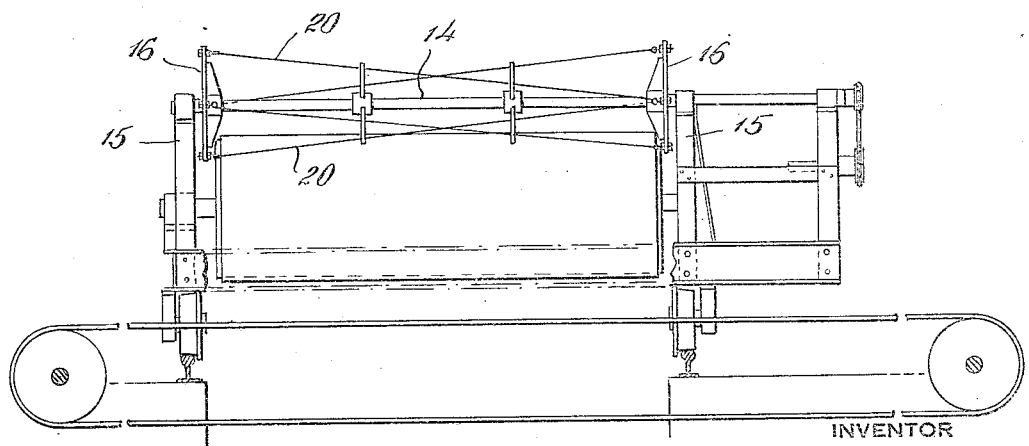
Fig. 4 is a front elevation of the apparatus shown in Fig. 1.

The drawings show an arrangement of apparatus which is particularly useful in handling moist finely divided materials such as flotation concentrates and thickened slimes.

The conveyor 10 is provided with the usual pulley 11 and has its upper surface disposed beneath a discharge opening in a storage bin (not shown). A second conveyor 12 extends transversely of the conveyor 10 and is disposed immediately below the discharge end thereof. A distributor is mounted adjacent the discharge end of the conveyor 10. The distributor comprises a central shaft 14 suitably mounted for rotation in bearings carried by brackets 15 adjacent the ends of the pulley 11 at the discharge end of the conveyor 10. End spiders 16, which may be solid metal castings or plates, are rigidly mounted on the shaft 14 and spaced apart a distance slightly greater than the width of the conveyor 10. The spiders 16 are provided with openings in their peripheral edge portions for receiving eye-bolts 17. Wires 20, which may be of any desired size and material, are drawn taut between the two end spiders and attached to the eye-bolts 17. The end spiders are similar in construction and the wires 20 are preferably so mounted that each is attached to an eyebolt in one spider and to an eyebolt immediately adjacent the corresponding eyebolt in the other spider. Opposite ends of adjacent wires lie in planes containing the axis of the shaft 14. The effect is a substantially spiral arrangement of cutting wires in which at least one wire is always an effective cutting agent. Any desired number of wires may be employed and blades of any suitable thickness and width may be substituted for the wires.

Intermediate spiders 21 provide a combined cutting and wire supporting effect. The intermediate spiders comprise a central hub 22 and a number of radial arms 23 corresponding in number to the number of wires used. The radial arms 23 are notched at their ends to receive the wires. The intermediate spiders may be spaced apart any desired distances and any desired number may be used.

The conveyors may be driven in any suitable manner. The distributor is preferably synchronized with the driven pulley 11 at the discharge end of the conveyor 10. The distributor is preferably so positioned that the peripheral edges of the intermediate spiders are spaced slightly from the conveyor 10 near the top and on the discharge side of the pulley 11.

In the operation of the apparatus, the distributor and the pulley 11 are rotated in opposite directions. As the material slowly approaches the distributor on the conveyor 10, the wires 20 pass downwardly and gradually cut a thin sheet or layer from the mass. At the same time the intermediate spiders serve to cut the layer thus loosened into two or more sections. The action of the distributor is such that the cutting of the material on the belt proceeds gradually from one side to the other, thus releasing the material and permitting it to be discharged gradually. The discharge of material from the conveyor is thus controlled and a uniform transfer is effected.

I claim:

1. The combination with two conveyors so arranged that material carried by one is discharged upon the other of a rotary distributor having a plurality of longitudinally extending cutters adjacent its periphery and one or more radial cutters between its ends.

2. A distributor comprising a central supporting shaft, a spider mounted on said shaft adjacent each end, a plurality of wires extending between and attached to said spiders, and one or more spiders mounted on said shaft between said end spiders and engaging said wires.

3. A distributor comprising a central supporting shaft, a spider mounted on said shaft adjacent each end, a plurality of wires extending between and attached to said spiders, the point of attachment of each wire on one spider being in advance of its point of attachment on the other spider and one or more spiders mounted on said shaft between said end spiders and engaging said wires.

4. The combination with a conveyor of the belt type of a rotary distributor provided with substantially spirally arranged cutting members mounted adjacent the discharge end of said conveyor and adapted to control the transfer of material therefrom.

5. The combination with a conveyor including a belt, and a belt supporting pulley at the discharge end of the conveyor mounted for rotation about a horizontal axis, of a spiral distributor mounted for rotation about an axis parallel to the axis of rotation of the belt supporting pulley adjacent the discharge end of the conveyor, and means for rotating the belt supporting pulley and the distributor in opposite directions.

6. The combination with a conveyor including a belt, and a belt supporting pulley at the discharge end of the conveyor mounted for rotation about a horizontal axis, of a spiral distributor mounted for rotation about an axis parallel to the axis of rotation of the belt supporting pulley adjacent the discharge end of the conveyor on the discharge side of the pulley.

In testimony whereof I affix my signature.

CHARLES R. KUZELL.